United States Patent
Schwab

(10) Patent No.: US 6,383,260 B1
(45) Date of Patent: May 7, 2002

(54) VENTURI SCRUBBER WITH OPTIMIZED COUNTERFLOW SPRAY

(75) Inventor: James J. Schwab, Napa, CA (US)

(73) Assignee: EnviroCare International, Inc., Novato, CA (US)

( * ) Notice: Subject to any disclaimer, the term of this patent is extended or adjusted under 35 U.S.C. 154(b) by 0 days.

(21) Appl. No.: 09/577,691

(22) Filed: May 22, 2000

(51) Int. Cl.[7] .............................................. B01D 47/10
(52) U.S. Cl. ..................... 95/216; 96/323; 261/DIG. 54
(58) Field of Search ................... 261/DIG. 54; 95/216; 96/323, 312, 275

(56) References Cited

U.S. PATENT DOCUMENTS

| | | | |
|---|---|---|---|
| 2,020,850 A | * 11/1935 | Myhren et al. | 261/DIG. 54 |
| 2,913,232 A | * 11/1959 | Silverman | 261/DIG. 54 |
| 3,385,030 A | * 5/1968 | Letvin | 261/DIG. 54 |
| 3,386,712 A | * 6/1968 | Pafla | 261/DIG. 54 |
| 3,406,953 A | * 10/1968 | Moore | 261/DIG. 54 |
| 3,448,562 A | * 6/1969 | Wisting | 261/DIG. 54 |
| 3,601,374 A | * 8/1971 | Wheeler | 261/DIG. 54 |
| 4,012,469 A | * 3/1977 | Accortt | 261/DIG. 54 |
| 4,411,846 A | * 10/1983 | Ulrich et al. | 96/296 |
| 4,828,768 A | * 5/1989 | Talmor | 261/DIG. 54 |
| 5,178,653 A | * 1/1993 | Litja et al. | 96/312 |
| 5,279,646 A | * 1/1994 | Schwab | 261/DIG. 54 |
| 5,484,471 A | * 1/1996 | Schwab | 261/DIG. 54 |
| 5,512,085 A | * 4/1996 | Schwab | 261/DIG. 54 |
| 5,759,233 A | * 6/1998 | Schwab | 261/DIG. 54 |

OTHER PUBLICATIONS

W. Strauss, "Industrial Gas Cleaning," "Particle Collection by Liquid Scrubbing," Pergamon Press Ltd., pp. 318–331, (1996).
Product Brochure for Type CAA Scrubber, "Counter Current Air Atomizing Scrubber for Cleaner Air," Fuller Bulk Handling Corporation, pp. 1–2.
BETE Fog Nozzle, Inc., "Spray Nozzles for Industry, Fire Protection and Pollution Control" at <http://www.bete.com>, 1 pg., Sep. 7, 2001.
"Figure 9—Venturi Scrubber Geometry," 1 pg. (author unknown).

* cited by examiner

Primary Examiner—Duane S. Smith
(74) Attorney, Agent, or Firm—Coudert Brothers LLP

(57) ABSTRACT

A venturi scrubber for cleansing a contaminated gas flow is disclosed. An optimized spray of liquid droplets are injected into the gas flow from one or more nozzles positioned within the throat of each venturi element. The spray is injected counter to the direction of gas flow to increase interactions between contaminant particles and spray droplets. Preferably, hydraulic nozzles are used which emit a hollow cone spray. The spray droplets are preferably in the range of 40–200 microns mean mass diameter (MMD).

16 Claims, 3 Drawing Sheets

VENTURI SCRUBBER WITH OPTIMIZED COUNTERFLOW SPRAY

FIELD OF THE INVENTION

This invention relates to the field of air pollution control, and is particularly directed to an improved venturi scrubbing system for removing contaminants from a gaseous effluent stream, such as the output of an incinerator.

BACKGROUND OF THE INVENTION

Over the past several decades the control of air pollution has become a priority concern of society. The United States, and other countries, have developed highly elaborate regulatory programs aimed at requiring factories, and other major sources of air pollution, to install the best available control technology (BACT) for removing contaminants from gaseous effluent streams released into the atmosphere. The standards for air pollution control are becoming increasingly stringent, so that there is a constant demand for ever more effective pollution control technologies. In addition, the operating costs of running pollution control equipment can be substantial, and so there is also a constant demand for more efficient technologies.

Concerns about pollution control are directed to more than air pollution, and removing contaminants from one medium frequently results in their introduction into another. For example, the treatment of municipal wastewater under the Clean Water Act has resulted in an enormous increase in the amount of sewage sludge that must be disposed of. Many communities lack adequate disposal sites to discard sludge that is generated by their municipal wastewater treatment plants in landfills, and are turning to incineration as an alternative method of disposal. Incineration of sludge, or other waste products, while greatly reducing the volume of material that must be disposed of on land, may result in the release of contaminants in the sludge into the atmosphere. In this regard, it is noted that the sludge generated by many municipalities is contaminated by highly toxic heavy metals and organic compounds, as well as acidic compounds such as chlorides and sulfates. The release of such compounds into the atmosphere is highly regulated, and sludge incineration systems are required to use BACT for controlling the release of contaminants into the atmosphere.

One well-known type of device for removing contaminants from a gaseous effluent stream is a venturi scrubber. Venturi scrubbers are generally recognized as having the highest fine particle collection efficiency of available scrubbing devices. As the name implies, in a venturi scrubber the effluent gas is forced or drawn through a venturi tube having a narrow "throat" portion. As the gas moves through the throat it is accelerated to a high velocity. Droplets of a scrubbing or cleansing liquid, typically water, are created in the venturi, usually in the vicinity of the throat, and enter the gas flow. The droplets used are generally many orders of magnitude larger than the contaminant particles to be collected and, as a consequence, accelerate at a different rate through the venturi. The differential acceleration causes interactions between the droplets and the contaminant particles, such that the contaminant particles are collected by the droplets. The collection mechanisms involve, primarily, collisions between the particles and the droplets and diffusion of particles to the surface of the droplets. In either case, the particles are captured by the droplets. Depending on the size of the contaminant particles, one or the other of these mechanisms may predominate, with diffusion being the predominant collection mechanism for very small particles, and collision or interception being the predominant mechanism for larger particles. A venturi scrubber can also be efficient at collecting highly soluble gaseous compounds by diffusion. A detailed description of these scrubbing mechanisms is discussed in Chapter 9 of Air Pollution Control Theory, M. Crawford, (McGraw-Hill 1976).

After the particulate contaminants are collected by the scrubbing droplets, the droplets are then removed from the effluent stream which is thereby cleansed. Removal of the droplets may be accomplished by a number of known means, which typically rely on the fact that the scrubbing liquid droplets are relatively large and, due to inertia, cannot change direction rapidly. Thus, to remove the droplets, the gas flow may be directed toward a surface such as an impingement plate. While the gas moves around the surface, the inertia of the relatively large droplets causes them to strike the surface where they are captured. Likewise, the droplets may be captured by a circular flow, as in a cyclonic separator, where the relatively large droplets collide with the wall of the separator due to centrifugal force.

Most venturi scrubbers in use today are "self-atomizing," i.e., the droplets are formed by allowing a liquid to flow into the throat of the venturi where it is atomized by the gas flow. While very simple to implement, this method is not able to produce droplets of very small mass median diameter, typically 500–2000 microns.

The primary methods heretofore utilized in improving the collection efficiency of a venturi scrubber have been to decrease the size of the throat or to increase the overall rate at which gas flows through the system. Both of these methods increase the differential velocities between the contaminant particles and liquid droplets as they pass through the throat of the venturi. This causes more interactions between particles and droplets to occur, thereby improving contaminant removal. However, increasing the collection efficiency in this manner comes at a cost of significantly higher energy input into the system, thereby resulting in higher operating costs. The extra energy is expended due either to the increased overall flow resistance attributable to the reduced throat diameter, or to the increased overall flow rate through the venturi. In either case, the pressure drop across the venturi is increased and greater pumping capacity is required. Most prior art efforts to increase the fine particle collection efficiency of a venturi scrubber have involved substantial increased energy input into the system.

Of particular concern to those in the field of air pollution control is the collection of "optically active" particles. As used herein, the term "optically active particles" should be understood to mean particles having a diameter in the range of approximately 0.1 to 1.0 microns. These particles are difficult to collect in conventional venturi scrubbers due to their small size. Nonetheless, particles in this size range often comprise toxic material the release of which is not permitted. Due to the relatively large surface area of optically active particles, they absorb a disproportionate amount of heavy metal contamination. As their name implies, optically active particles interact with light. Even if they do not contain toxic components, the emission of optically active particles is highly visible and undesirable from an aesthetic point of view.

As noted above, municipal sewage sludge often contains significant amounts of toxic heavy metal and organic materials. Heretofore, scrubbers have not been efficient in removing these materials from the gaseous effluent of incinerated sludge. Municipal sewage sludge incineration typically requires the use of high temperatures (i.e., between 900°–1,600° F.). At these elevated temperatures, the organic materials are vaporized and are, thus, not susceptible to efficient scrubbing. One approach to this problem has been to use an afterburner on the effluent stream, whereby the organic vapors are combusted and, thereby, transformed into non-toxic compounds, primarily water vapor and carbon dioxide. However, incomplete combustion of the organics can result in the production of carbon monoxide, soot, and/or gaseous hydrocarbons. If soot (i.e., fine particles of carbon) is produced, other compounds, such as those containing heavy metals, can be adsorbed on the surface of the carbon particles. Any particles that are formed in this way are likely to be difficult to collect due to their small diameter. And, as noted above, very small particles are efficient collectors of volatile heavy metals.

In coassigned U.S. Pat. No. 5,279,646, (hereafter the '646 patent) by the inventor hereof (the disclosure of which is incorporated by reference), it is taught to optimize the size of the scrubbing droplets to promote the maximum collection efficiency for optically active contaminant particles. This patent describes the fact that there is a point at which a further decrease in the size of the droplets of the scrubbing liquid begins to become detrimental. The '646 patent teaches a method and apparatus for creating optimized droplets which are introduced into the effluent gas flow downstream of the venturi throat. The '646 patent further teaches the use of a two-fluid nozzle to create droplets of a scrubbing or cleansing liquid. The inventive apparatus and method of the '646 patent have proven to be quite successful when using the preferred two-fluid nozzle.

The '646 patent notes that certain hydraulic (i.e., liquid only) nozzles are capable of producing droplets in the optimal range and could be used in practicing the invention described in the patent. However, as a practical matter, it has proven difficult to achieve all of the objectives of the '646 patent when using a hydraulic nozzle.

As noted, the trend in pollution control has been towards increased stringency, such that many existing facilities face the need to upgrade or retrofit their existing pollution control equipment to achieve better results. In addition, facility owners/operators are often interested in upgrading or retrofitting existing pollution control equipment to realize the benefit of lower operational costs from improved efficiency.

In many situations, when retrofitting or upgrading an air pollution control system it is difficult due to space or power considerations to provide the pressurized air needed to operate the two-fluid nozzles described in the '646 patent. Therefore, in such situations, it is difficult to realize the benefits described in the patent.

Accordingly, it is an object of the present invention to provide an improved venturi scrubber that is capable of increased particle collection without the need to use a two-fluid nozzle.

It is a further object of the present invention to attain improved particle collection efficiency without the need to increase the rate of gas flow through the system or to decrease the size of the venturi throat.

Another object of the present invention is to provide an improved venturi scrubber wherein the size of the droplets used to collect contaminant particles is optimized.

Another object of the present invention is to provide a venturi scrubber having a high collection efficiency.

Yet another object of the present invention is to provide a venturi scrubber which has the characteristics needed to efficiently generate droplets having an optimal size for collecting optically active contaminant particles.

SUMMARY OF THE INVENTION

These and other aspects of the present invention which will be apparent to those skilled in the art after reading the specification and claims hereof, are realized in a novel venturi scrubbing apparatus which uses a hydraulic nozzle. In its broad aspects the present invention is directed to a venturi scrubber for cleansing a contaminated gas flow, comprising a venturi having an inlet cone for receiving and accelerating a flow of gas to be cleansed, a throat, and an outlet cone wherein the gas flow is decelerated, such that the velocity of the gas flow through said venturi is maximum in said throat and a nozzle for introducing fine droplets of a cleansing liquid into the contaminated gas flow, the nozzle being positioned within the venturi throat and oriented such that droplets ejected from said nozzle have a component of velocity which is counter to the direction of gas flow through said venturi. Preferably, the nozzle is a hydraulic nozzle which produces droplets in the range of 40–200 microns mass mean diameter (MMD), and the line pressure of the liquid supplied to the nozzle is in the range of 80–320 psig. In one embodiment, the venturi throat has a diameter no greater than about four and one half inches (11 cm), the nozzle is coaxial with the venturi throat and produces a hollow cone spray having an included angle of approximately 90–150 degrees. If a larger throat diameter is used, a plurality of nozzles may be positioned within said throat and oriented such that droplets ejected from said nozzles have a component of velocity which is counter to the direction of gas flow through said venturi. In another aspect the present invention is directed to a method of cleansing a gas flow using a venturi scrubber comprising the steps of causing a gas to be cleansed to flow through a venturi having a throat and injecting droplets of a cleansing liquid into said gas flow from a nozzle positioned within the throat of said venturi, said droplets being ejected into said gas flow in a direction which is counter to the gas flow.

DETAILED DESCRIPTION

The present invention is directed to a venturi scrubber for cleansing a gas flow, such as a pollution source, which is capable of removing optically active particles from the gas flow, using a spray from a hydraulic nozzle positioned within the throat of the venturi and oriented to eject droplets of a scrubbing liquid counter to the direction of gas flow through the venturi.

Figure 1:
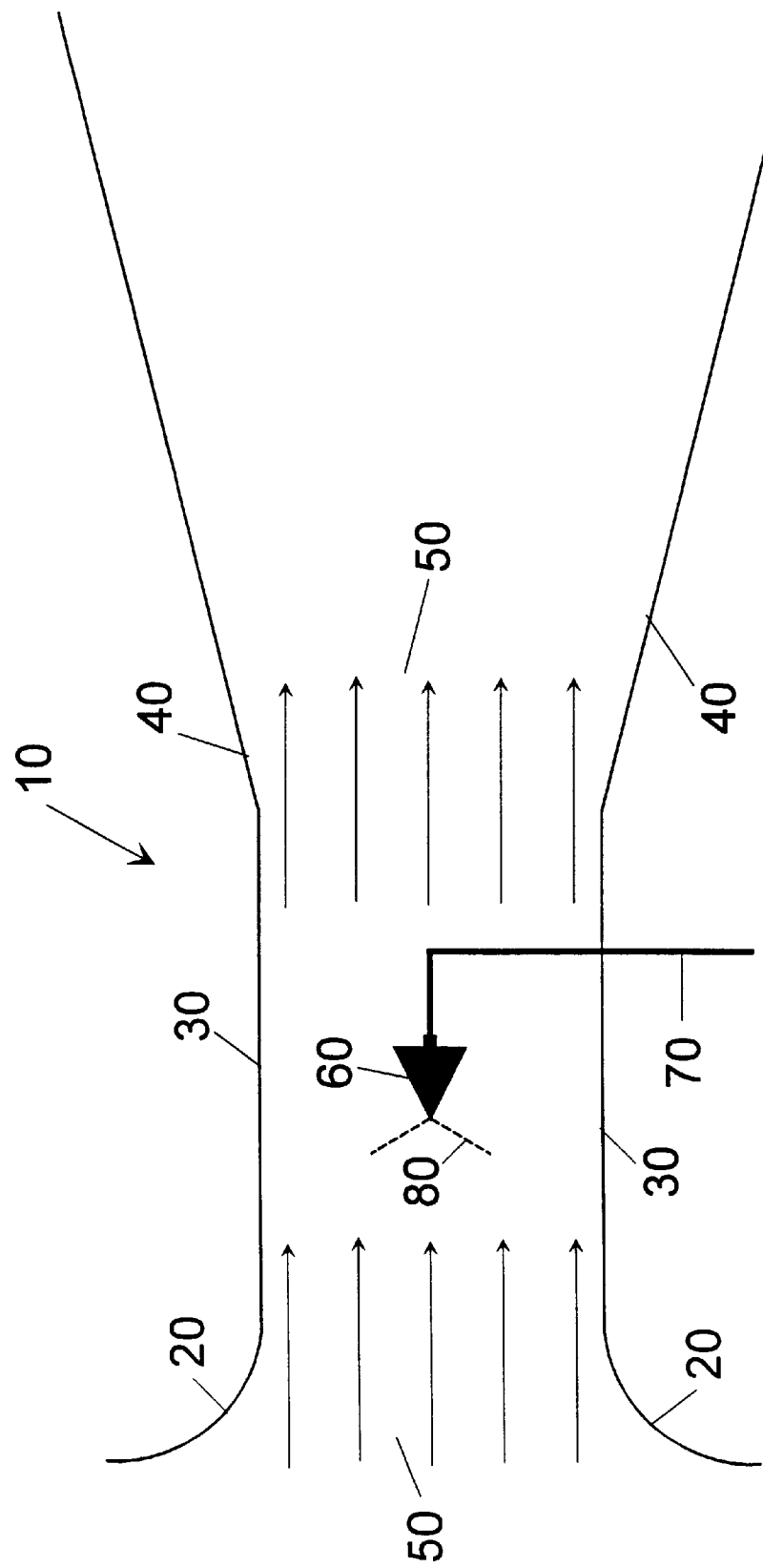
FIG. 1 is a schematic cross-sectional diagram of the venturi scrubber of the present invention.

Turning first to FIG. 1, a venturi scrubber 10 according to the present invention is shown. As is known, venturi scrubber 10 comprises an inlet "cone" 20, a throat 30 and an outlet cone 40. Preferably, venturi 10 is axially symmetrical such that, for example, throat 30 is cylindrical. However, other configurations are possible. For example, venturi 10 may, alternatively have a rectangular cross section normal to the gas flow direction depicted by arrows 50. While inlet 20 is described for convenience as a cone, in the embodiment depicted the wall of the inlet is not truly conical. Rather, as depicted inlet 20 has a curved wall. The curved venturi inlet 20 depicted is referred to as a "bellmouth" inlet and is known to be a low static pressure loss inlet.

As is well-known, as the gas flow 50 travels through venturi 10 it is accelerated by the reduced diameter of inlet 20 and throat 30, and then decelerates as the diameter increases in outlet cone 40. As described above, the process of accelerating and decelerating gas flow 50 facilitates interactions between droplets of a scrubbing liquid and particles in the gas flow, such that contaminant particles are captured by the droplets and removed from the gas flow with high efficiency.

A scrubbing liquid is introduced through liquid inlet 70 to a hydraulic nozzle 60 mounted within throat 30 of venturi 10, such that the spray 80 from nozzle 60 has a component of its velocity which is counter to gas flow 50, i.e., in a direction along the axis of the venturi opposite to the direction of gas flow. Hereinafter, when reference is made to spraying or ejecting droplets "counter" to the direction of gas flow, it is intended only that the sprayed or ejected droplets leaving the nozzle have a component of their velocity which is counter to the gas flow. In one embodiment of the invention, the water pressure to the nozzle is in the range of about 80–320 psig, and the nozzle produces fine droplets in a hollow cone spray. Preferably water is injected at a rate of about 1–10 gallons per 1,000 actual cubic feet (ACF) of gas.

Figure 2:
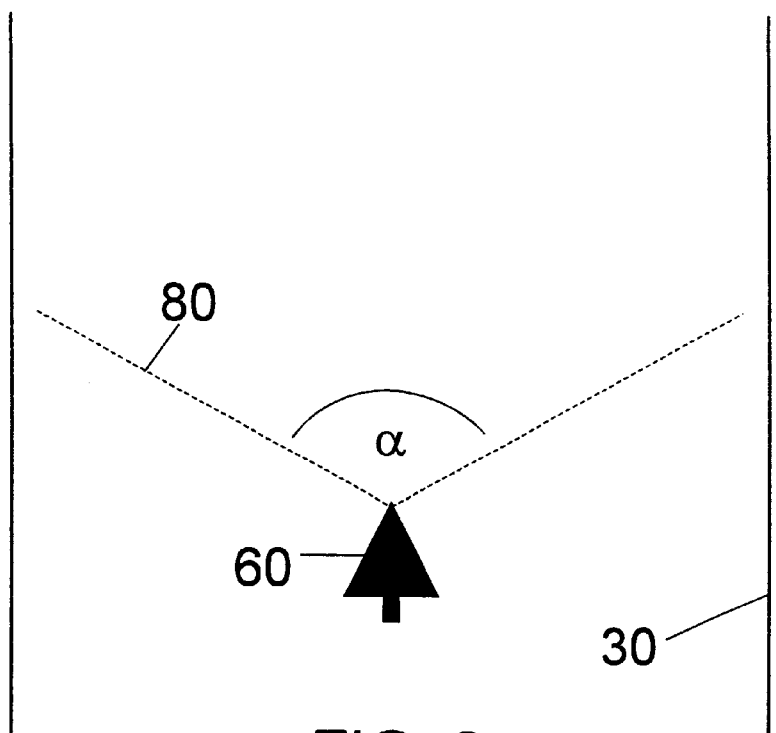
FIG. 2 is a schematic cross-sectional diagram of the throat of a preferred embodiment of the venturi scrubber of the present invention showing the spray pattern in the absence of a gas flow through the throat.
Figure 3:
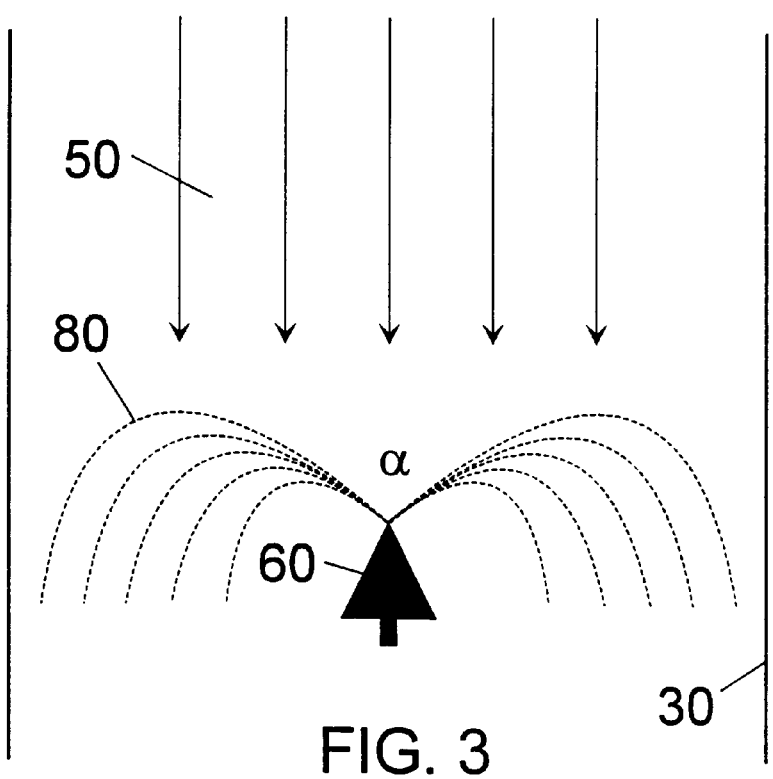
FIG. 3 is a schematic cross-sectional diagram of the throat of a preferred embodiment of the venturi scrubber of the present invention showing the spray pattern in the presence of a gas flow through the throat.

As described, nozzle 60 produces a hollow spray 80, such that most of the scrubbing liquid is ejected in a conical pattern having an included angle $\alpha$, which is preferably in the range of 90°–150°. As depicted in FIG. 2, under static conditions, the droplets in spray 80 will travel linearly until they intercept the wall of venturi throat 30. However, as depicted in FIG. 3, in the presence of gas flow 50, the trajectories of the droplets in spray 80 become curved as the droplets become entrained in the gas flow. The trajectory of a particular droplet will depend primarily on its size and ejection velocity. It will be appreciated that the use of a spray injected counter to gas flow, in accordance with the present invention, maximizes the differential velocity between the gas flow and the droplets of scrubbing liquid. This enhances the particle scrubbing efficiency. At the same time, the use of a spray which has a component which is radial to the venturi axis promotes the uniform distribution of droplets in the gas flow as it transits the venturi.

Because of their relatively greater momentum (and lower relative drag) larger droplets, and droplets with a higher initial ejection velocity, will travel farther laterally (i.e., towards the wall of venturi throat 30), than smaller, lower velocity droplets. In accordance with the present invention, this natural sorting and distribution of the droplets according to their initial momentum ensures that spray 80 is relatively evenly distributed within throat 30 of venturi scrubber 10, as shown in FIG. 3. Preferably, the nozzle, the scrubbing liquid pressure and the venturi dimensions are selected so that spray droplets of appropriately small diameter are distributed throughout the entire venturi throat 30 over the range of gas flows encountered in the scrubbing system. In one aspect of the present invention, a controller is used to adjust the nozzle pressure with changes in the gas flow, to ensure even distribution of spray droplets under different flow conditions.

It is considered acceptable that very large droplets, representing only a small percentage of the volume of injected scrubbing liquid, will travel all the way to wall 30. The loss of large droplets, which do not efficiently scrub the gas flow, is not considered consequential as long as a large volume of scrubbing liquid is not being lost.

In most applications, the preferred scrubbing liquid is water due to its near universal availability, low cost and relative ease of handling. In some applications it may be desirable to incorporate into the water one or more other chemicals selected to react with gaseous substances in the gas flow. For example, if the gas flow is highly acidic, it may be desirable to use a water-based solution or mixture which neutralizes the acid components in the gas. In specialized applications other scrubbing liquids can be employed, and the specific scrubbing liquid used is not important to the present invention, although the physical properties of the liquid, such as the viscosity, may effect the selection and placement of the nozzle insofar as the physical properties affect the formation of droplets.

Figure 4:
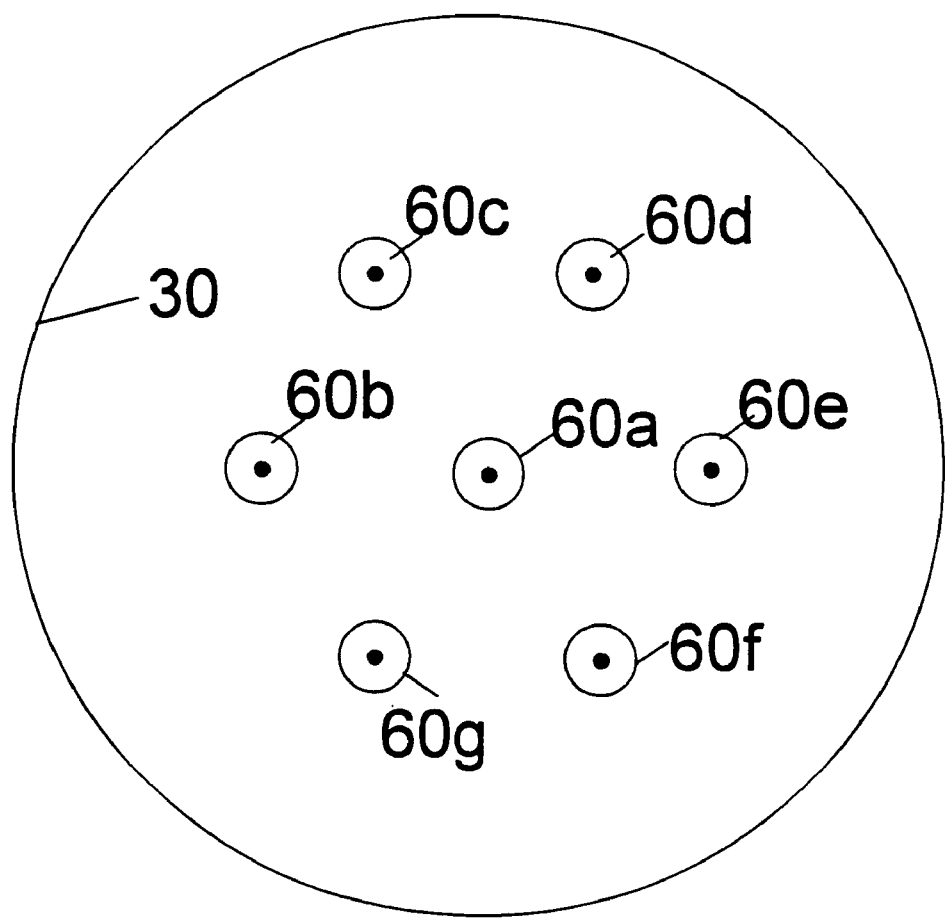
FIG. 4 is a schematic cross-sectional diagram of the throat of an alternative embodiment of the venturi scrubber of the present invention comprising a plurality of nozzles.

As the diameter of the venturi throat is increased, it becomes more difficult to produce a spray which uniformly covers the entire throat diameter using a single nozzle. Accordingly, when a larger diameter venturi is desired, a nozzle array may be used in the venturi throat rather than a single nozzle. Such a nozzle array may comprise, for example, seven nozzles, six of which are positioned at the corners of a hexagon having its center located on the axis of the venturi with the seventh nozzle positioned on the axis. FIG. 4 is a schematic cross-sectional diagram of an embodiment of the present invention comprising seven nozzles, 60a–60g; six of the nozzles are placed at the points of a hexagon with the seventh being positioned in the center, on the axis of the venturi throat. In the preferred embodiment, the points of the hexagon are derived by fitting seven equal-sized circles, each having a diameter of one-third of the venturi throat diameter, into a circle having the throat diameter. The points of the hexagon are at the centers of the outer six circles.

Suitable hydraulic nozzles for use in the present invention may be obtained from BETE Fog Nozzle Inc., 50 Greenfield Street Greenfield, Mass. 01301. In one embodiment, a model TF8W nozzle was used with a ¼ inch pipe at a water pressure of approximately 200 psi. At this pressure the nozzle ejects almost six gallons of scrubbing liquid per minute. This nozzle ejects a conical spray having an included angle of approximately 120°. The preferred nozzle produces water droplets of 100 microns MMD, with 80% of the volume of the droplets being in the range of 50–180 microns in diameter when operated at a pressure of 200 psig. Droplets in this size range, when used in connection with the present invention, produce excellent scrubbing efficiency as described in further detail below.

A test of the venturi scrubber of the present invention was conducted in connection with a municipal sewage sludge fluid bed incineration unit. A traditional self-atomizing venturi having a 40" pressure drop previously in use was replaced using two venturi scrubber elements constructed in accordance with the present invention. In operation, the old venturi had overall particulate emissions of about 0.004 gr/dscf, while the new system had an overall emissions of about 0.0009 gr/dscf at a 20" pressure drop and a 90 psig water pressure to BETE TF6W nozzles, one in each venturi throat.

While the present invention has described in connection with preferred embodiments thereof, it will be apparent to those skilled in the art that there are many variations and equivalents of that which has been described. Accordingly, it is intended that the invention should be limited only by the following claims.

What is claimed is:

1. A venturi scrubber for cleansing a contaminated gas flow, comprising:

a venturi having an inlet cone for receiving and accelerating a flow of gas to be cleansed, a throat, and an outlet cone wherein the gas flow is decelerated, such that the velocity of the gas flow through said venturi is maximum in said throat;

a nozzle for introducing fine droplets of a cleansing liquid into said gas flow, said nozzle being positioned within said throat and oriented such that droplets ejected from said nozzle have a component of velocity which is counter to the direction of gas flow through said venturi.

2. The venturi scrubber of claim 1 wherein said nozzle is a hydraulic nozzle.

3. The venturi scrubber of claim 2 wherein said nozzle produces droplets in the range of 40–200 microns MMD.

4. The venturi scrubber of claim 3 wherein the liquid pressure to said nozzle is in the range of 80–320 psig.

5. The venturi scrubber of claim 1 wherein said nozzle is coaxial with said throat.

6. The venturi scrubber of claim 1 wherein said nozzle produces a conical spray having an included angle in the range of approximately 90 degrees–approximately 150 degrees.

7. The venturi scrubber of claim 1 wherein the gas flow is at least about 500 acfm.

8. The venturi scrubber of claim 1 wherein the diameter of said throat is no greater than about four and one half inches (11 cm).

9. The venturi scrubber of claim 1 comprising a plurality of nozzles positioned within said throat and oriented such that droplets ejected from said nozzles have a component of velocity which is counter to the direction of gas flow through said venturi.

10. A venturi scrubber for cleansing a gas flow, comprising:

a venturi comprising an inlet cone for receiving a flow of gas to be cleansed, a throat and an outlet cone, a hydraulic nozzle substantially coaxially positioned within said throat for ejecting droplets having a diameter in the range of 40–200 microns MMD of a cleansing liquid into said gas flow, said nozzle being oriented such that droplets are ejected counter to the direction of said gas flow.

11. A method of cleansing a gas flow using a venturi scrubber comprising the steps of:

causing a gas to be cleansed to flow through a venturi having a throat;

injecting droplets of a cleansing liquid into said gas flow from a nozzle positioned within the throat of said venturi, said droplets being ejected into said gas flow in a direction which is counter to the gas flow.

12. The method of claim 11 wherein said nozzle is a hydraulic nozzle.

13. The method of claim 11 wherein said nozzle produces droplets in the range of 40–200 microns MMD.

14. The method of claim 13 wherein said nozzle produces a hollow cone spray having an included angle in the range of between about 90 degrees to about 150 degrees.

15. The method of claim 11 wherein said cleansing liquid is supplied to said nozzle at a pressure of about 80 psig or more.

16. The method of claim 11 wherein said droplets are ejected from the nozzle at a speed of 100 fps or more.

* * * * *